May 31, 1960 L. O. CHASE 2,938,325
BUSH BEAN HARVESTER
Filed Oct. 11, 1954 2 Sheets-Sheet 1

INVENTOR.
Lyle O. Chase
BY
AGENT

May 31, 1960
L. O. CHASE
2,938,325
BUSH BEAN HARVESTER
Filed Oct. 11, 1954
2 Sheets-Sheet 2
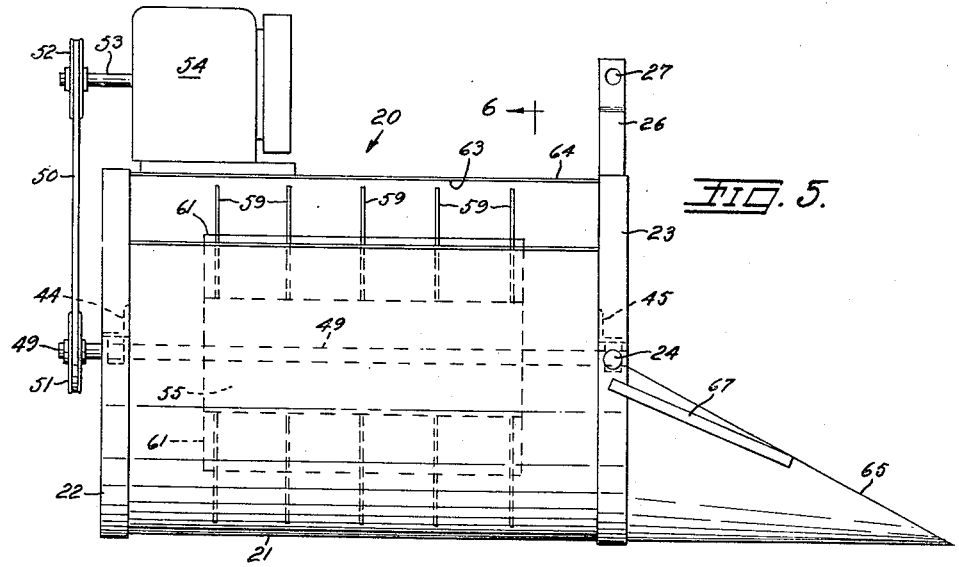
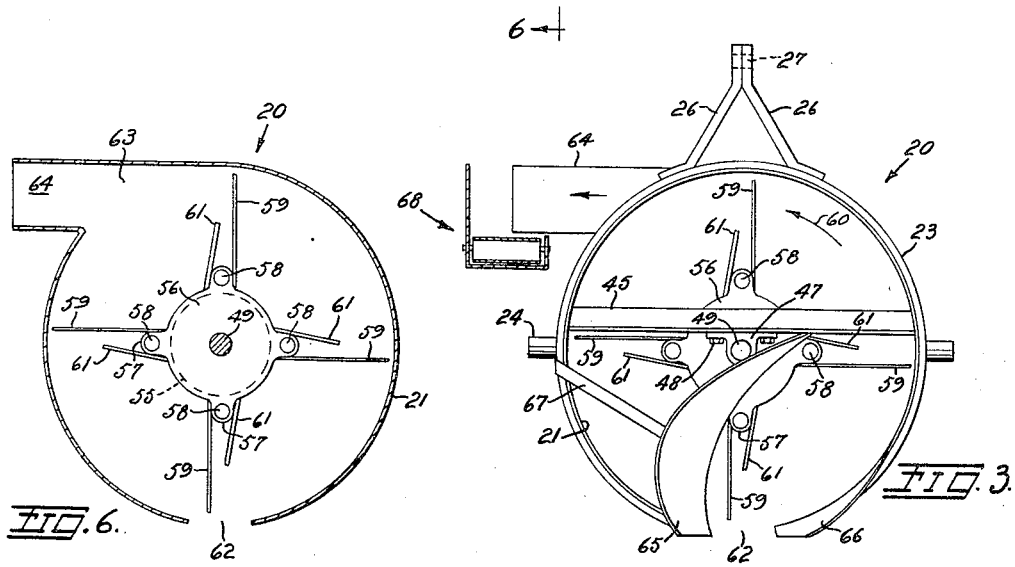
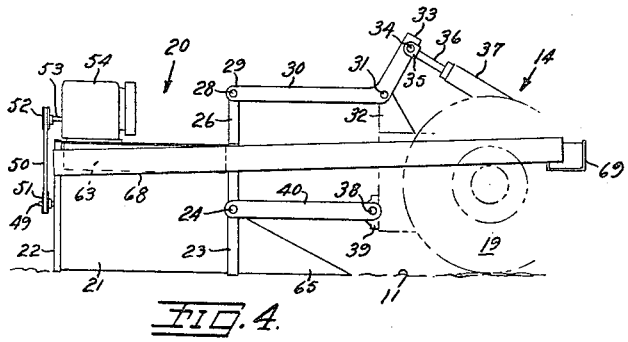
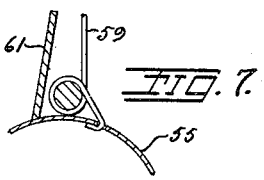
INVENTOR.
Lyle O. Chase
BY
AGENT

United States Patent Office 2,938,325
Patented May 31, 1960

2,938,325

BUSH BEAN HARVESTER

Lyle O. Chase, Boise, Idaho, assignor to Max C. Richardson, Portland, Oreg.

Filed Oct. 11, 1954, Ser. No. 461,534

4 Claims. (Cl. 56—130)

This invention relates generally to food crop harvesters and more particularly to harvesters for vegetable crops of the type in which the edible portion is the foliage and in which the edible portions are harvested in a critical green state for preservation by canning or freezing.

Although not limited to this one use the invention will be here disclosed as applied to the harvesting in their most tender and most succulent state of bush beans of the type of small lima beans which are planted in continuous carefully spaced rows and which grow in pods on bushes of from ten to fifteen inches in height.

Generally it should be understood that large areas of the Columbia River valley in the Pacific Northwest have been traditionally farmed for wheat. Due to the plant food requirement of wheat the fields lay fallow each alternate year. Within the last score of years it has been found that peas could be grown on this ground on the off wheat years to actually improve the ground and double the crop money to be taken from the soil. A very large frozen and canned pea industry in the Pacific Northwest has thus developed. Lately it has been found that the market for peas can be supplied without using all the fallow land available. This has resulted in a considerable amount of experimentation with large scale growing of bush beans.

That beans can thus be profitably grown and of the highest quality in large scale operation has been proven and the acreage so applied is growing rapidly. However, the small lima beans in their green state are much more easily damaged in handling than are peas. When pea harvesting methods are applied to the bean crop, large and expensive changes and additions to the handling and processing plants are required because in this harvesting method the whole bushes are gathered from the field in large batches and put through a threshing process which does not damage the small round peas but does materially damage the differently sized and shaped beans. Thus much added equipment at the processing plant and much added labor is required to finish and sort the product.

The present invention here disclosed relies on an entirely new philosophy of bean harvesting which has for its purpose the taking of the beans from the field in an undamaged condition and leaving the bean in the pod during transportation and until the other vine material is removed. In this case the bean is entirely protected and preserved in its own pod until ninety percent of the work of harvesting and processing is over and all that is left is to shell the bean from the pod. This final shelling can be done with machines for the specific purpose without damage to the bean itself. That all pre-handling and transportation of the bean should be done while in the pod is easily understood when it is noted that the processing plant may be fifty miles from the field and time, weather and rough handling will markedly degrade the shelled bean where it would have little effect on the beans protected in their pods.

It is the principal object of the present invention to provide a method of and means for removing from the root and stalks of a bean bush the foliage including the bean pods and to deliver the foliage and pods to a means for further processing while leaving the bush root remain in the ground and much of the bush stems attached to the root.

It is a second object to provide such a method and means by which the bean bushes in a row are successively enclosed in a processing cylinder together with a method and means for removing the foliage from each bush while in the cylinder.

It is a third object to provide such a method and means whereby the cylinder will pass along the row retaining the foliage from the consecutive bushes of the row while leaving the root with the larger stems attached to the ground.

It is a fourth object to provide such a method and means whereby a cylinder having a continuous longitudinal opening for its full length is transported along the bush row tangent to the ground so that all of the bush except the root will pass into the cylinder at the forward end of the longitudinal opening.

It is a fifth object to provide the method and means of the fourth object together with a method and means for defoliating the bush within cylinder.

It is a sixth object to provide a method and means of the fifth object together with a method and means for discharging all of the loose material of defoliation outward from the cylinder through a second longitudinal opening in the wall thereof at a higher elevation than the ground tangent opening.

It is a seventh object to provide the method and means of the sixth object in which as the ground tangent opening in the cylinder passes over the successive bushes of a row the root and principal stalks of the bush remain attached to the ground.

It is an eighth object to provide the method and means of the sixth object together with a method and means for collecting the material ejected from the second named opening in the wall of the cylinder and to transport the material to a collection means.

How these and other objects are provided is explained in the following description referring to the attached drawings in which Figure 1 is a view in plan of mechanism by which this invention may be practiced.

Figure 3 is a second fragmentary elevation similar to that of Figure 2.

Figure 4 is a fragmentary view in side elevation of a mechanism similar to that of Figure 1 but drawn to a reduced scale.

Figure 5 is an enlarged fragmentary view in side elevation of the left end of the arrangement of Figures 1 and 4.

Figure 6 is a view in elevation section along the line 6—6 of Figure 5.

Figure 7 is a fragmentary sectional view of a detail of this invention.

Like numerals of reference refer to like parts in the several figures of the drawings.

Figures 1, 2:
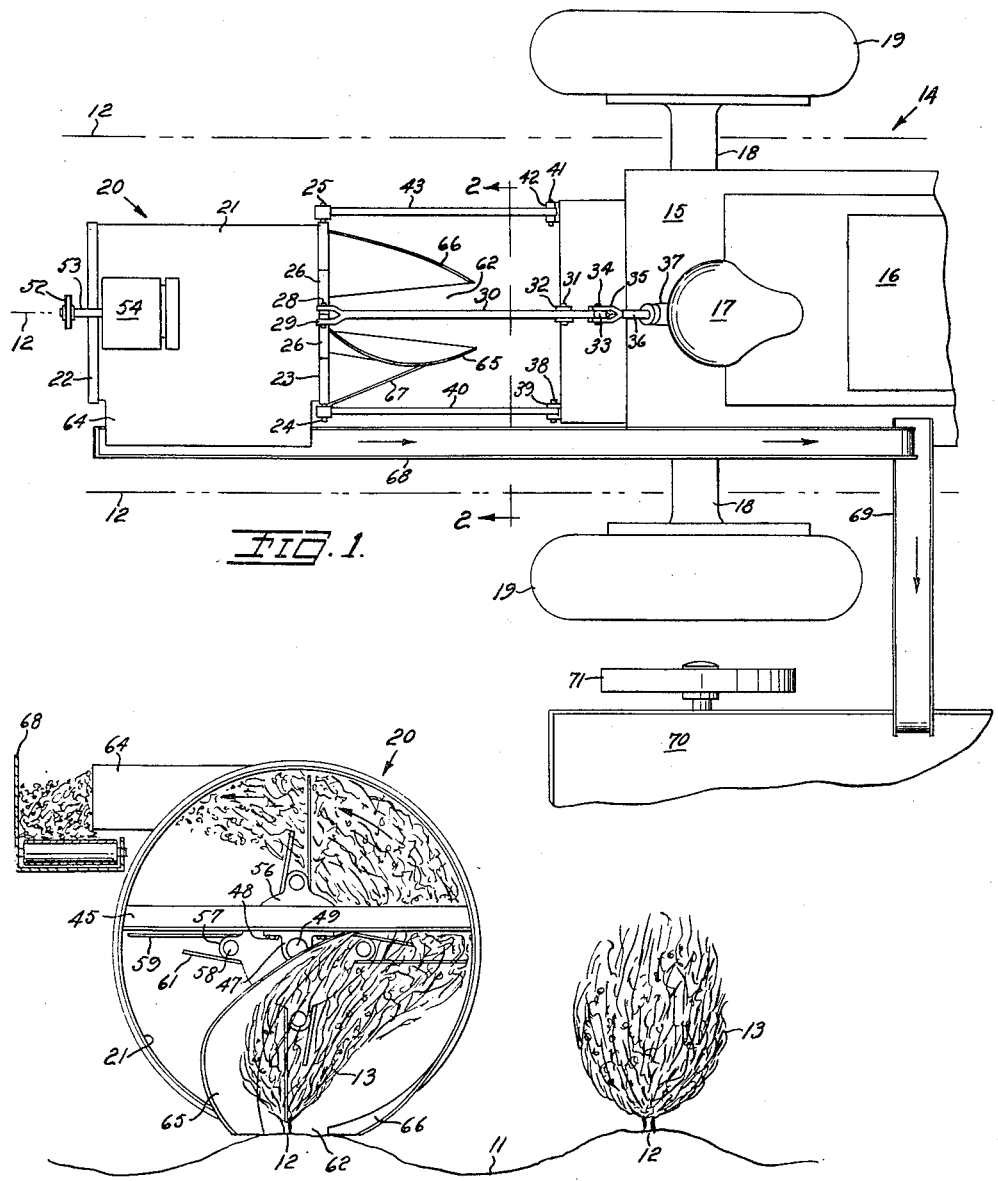
Figure 2 is an enlarged elevation along the line 2—2 of Figure 1.

Referring now to the drawings in Figure 2 is indicated the ground surface 11 of a field with multiple rows of uniformly spaced continuous rows 12, see also Figure 1, of bean bushes 13. For purposes of comparison assume the bush rows to be spaced twenty-two inches apart. At 14 is shown generally a common form of wheeled farm tractor having a body 15, an engine cover 16, a seat 17, a rear axle 18 and a pair of pneumatic tired rear wheels 19 spaced sixty-six inches apart, center to center, to straddle three adjacent rows of bean bushes as shown in Figure 1.

Adjustably supported on the rear of tractor 14 in a manner later to be described is a preferred form of the bean bush foliage harvester 20 which comprises the means of this invention by which the method of this invention may be practiced.

The harvester mechanism 20 is seen to include an open-ended cylindrical shell 21 reinforced about its ends with strap bands 22, 23. Formed outwardly from the opposite ends of the horizontal diameter of band 23 are supporting pivot pins 24, 25 and formed upwardly at the top end of a vertical diameter of band 23 is a pair of supporting straps 26 with a bearing hole 27 formed therethrough to receive pivot pin 28 adapted to pivot the bifurcated end 29 of bell crank 30 on straps 26. Bell crank 30 is pivoted by pin 31 on bracket 32 secured to tractor body 15. The other end 33 of bell crank 30 is pivoted on pin 34 to the bifurcated end 35 of piston rod 36 adapted to be positioned as desired in hydraulic cylinder 37 by means not shown because well known in the art and no part of this invention.

Pivoted at one end on pin 24 and at the other end on pin 38 secured by bracket 39 on body 15 is link strap 40. Pivoted at one end on pin 25 and at the other on pin 41 secured by bracket 42 on body 15 is link strap 43. It is seen that bell crank 30 with link straps 40 and 43 form a parallel motion mechanism to be manipulated by cylinder 37 and rod 36 to maintain the lower surface of cylinder 21 parallel to the ground surface 11 and spaced as desired therefrom.

Secured across the open ends of cylinder 21 are bearing supports 44, 45 on which are secured by bolts 48 bearing blocks 46, not shown, and 47, respectively, in which is journalled shaft 49 adapted to be driven at a variable desired speed through V-belt 50, sheaves 51, 52 and shaft 53 by a gas engine and speed reducer combination shown generally at 54.

Secured to shaft 49 midway between the ends of cylinder 21 is smaller cylinder 55 whose ends are closed by end plates 56 having spaced ears 57 between which, as shown, are secured support pipes 58 spaced from and parallel to the outer surface of cylinder 55.

Hooked into drum 55, as shown in Figure 7, and looped around pipes 58 are resilient steel rod beaters 59 spaced along pipes 58. It is understood that the beater rods 59 of one pipe 58 may be lined up the with beater rods of another pipe 58 or that the rods 59 of the several pipes 58 may be staggered from pipe to pipe as desired.

Forward of pipes 58 and rods 59 in the direction of rotation shown by arrow 60 in Figure 3 are backward impeller blades 61 extending longitudinally the full length of drum 55 and secured thereto at an angle of about ten degrees to a radius from shaft 49.

As shown in Figures 2, 3 and 6 cylinder 21 is formed with a longitudinal gap 62 for its full length at its bottom side. Also cylinder 21 is formed near its top with a full length longitudinal discharge opening 63 over which horizontally tangent discharge tunnel 64 is secured.

Extending forwardly of the leading edges of gap 62 in cylinder 21 are a pair of bush guides 65 and 66 extending gap 62 with the divergence of guides 65 and 66 such that gap 62 is about twice as wide at the forward end of guides 65, 66 as it is at cylinder 21. The forward ends of guides 65, 66 form acute angles to facilitate sliding under and raising the stem and foliage of bushes 13 as the harvester 20 is propelled along the bush rows 12. Guide 66 as shown is formed to approximate a fragmentary extension of cylinder 21 to which it is secured over its abutting edge. However guide 65 is curved as shown and is secured to cylinder 21 at its lower rear edge and to support 45 at its upper rear edge. For better support of guide 65, brace 67 may be secured between guide 65 and reinforcing band 23.

In operation it is seen that guides 65, 66 will slide under the bean bushes 13 as harvester 20 is propelled along the row of bushes and guide 65 will tip the bushes to enter cylinder 21 by leaning forwardly of gap 62 in the direction of rotation of impeller blades 61 and beaters 59 on drum 55. In the progress of cylinder 21 along the row with shaft 49 rotating in the direction shown at 60, Figure 3, beaters 59 will sever the bean pods and foliage from the roots and stems of the bushes while impellers 61 will prevent the escape of the severed foliage from the ends of cylinder 21 by means of a current of air drawn inwardly due to the centrifugal action of the impellers on the air in the cylinder. At the proper speed of shaft 49 as adjusted for the tractor speed, the bush size, and moisture conditions, the bush roots with stems will remain attached to the ground while the beating and centrifugal action of beaters 59 and blades 61 will remove the pods and foliage from the bushes and throw the pods and bushes out the upper opening 63 and outlet tunnel 64. As seen in Figure 2 the left side of cylinder 21 remains substantially open and free of bush material.

For disposal of the material emitted from outlet tunnel 64 there is indicated in the drawings generally a pair of belt conveyors 68 and 69 which are understood to be carried on the tractor and driven from the tractor mechanism but since conveyors of this type are old in the art the details of their construction and power drives are not shown. Conveyor 69 is indicated in Figure 1 to discharge in a bed 70 of a separately powered material gathering wagon one of whose wheels is shown at 71.

It is understood that the means of this invention centers around the structure and arrangement of cylinder 21 and its associated cooperating parts and that the method of this invention involves progressively enclosing the bean bushes in the cylinder 21 while the bushes remain attached to the ground, removing the pods and foliage from the bushes while in the cylinder, pasing the pods and foliage out of the cylinder through an opening provided therefor to a collection means and passing the cylinder from over the bushes, the bush roots and stems remaining attached to the ground at all times.

In the adjective use herein of the word "motor" as in "motor means" the word "motor" is to be defined as "causing or imparting motion."

In the opposed use herein of the verbs "enclose" and "unclose" the word "enclose" is to be defined as "to put into a closed state" and the word "unclose" is to be defined as "to bring out of a closed state" where the word "closed" is a form of the verb "close" meaning "surround." The word "unclosing" is to be defined as "bringing out of a closed state" where the word "closed" is defined as "surrounded."

Having thus listed some of the objects of my invention, illustrated and described a preferred form in which my invention may be practiced and described its operation, I claim:

1. A harvester for bush beans in their green state, said beans being grown in laterally spaced continuous rows and said harvester comprising an open ended cylinder, carriage means for supporting said cylinder for movement along one of said rows, motor means for propelling said carriage means and said cylinder longitudinally of said cylinder and said one of said rows and tangentially of the ground surface at said row, said cylinder being formed with a longitudinal gap therethrough at its position of tangency with said ground surface whereby as said cylinder is propelled along said row the bushes of said row will be passed through said cylinder with the stems and roots of said bushes remaining attached to the ground, said cylinder being formed with a substantially horizontally tangential outlet opening extending longitudinally substantially the entire length of said cylinder at its upper side, a shaft rotatably supported axially of said cylinder, a plurality of air impeller blades spaced about said shaft and secured longitudinally on said shaft, motor means operatively connected to said shaft for rotating said shaft, a plurality of beater rods carried on said shaft and said beater rods being spaced around and longitudinally of said shaft, whereby as said cylinder is propelled along said row and said shaft is rotated said bushes will progressively be enclosed by and freed from said cylinder and said beater rods and said impeller blades will remove the bean pods and foliage from said bushes and discharge said bean pods and foliage from said cylinder tangentially through said outlet.

2. A harvester for vegetables of the type in which the edible portion of the vegetable plants is included in the above ground foliage thereof, said vegetable plants being planted in continuous laterally spaced rows, said harvester comprising means forming a cylinder having a gap through which the above ground parts of said plants of one of said rows will pass as said cylinder is propelled longitudinally of said row, carriage means for supporting said cylinder tangentially of the ground at said gap, motor means operatively connected with said carriage means for propelling said cylinder along said row, a shaft rotatably carried within said enclosure parallel to said row, a plurality of air impeller blades spaced about said shaft and carried thereon to rotate therewith, a plurality of elongated beaters spaced about said shaft and longitudinally thereof, said beaters being carried on said shaft to rotate therewith, motor means operatively connected with said shaft for rotating said shaft as said cylinder is propelled along said row and said cylinder being formed with an outlet opening therethrough in the throw path of said impellers and said beaters.

3. A harvester of foliage from vegetable plants grown in contiuous spaced rows, said harvester comprising a plurality of supporting wheels, an open ended cylinder supported on said wheels and formed with a continuous longitudinal gap along the bottom thereof and a longitudinally positioned horizontally tangential outlet opening along the top thereof, motor means operatively connected to one of said wheels for propelling said cylinder along one of said rows of plants with said cylinder substantially tangential to the ground surface at said row and said gap, a shaft rotatably carried in said cylinder axially thereof, a plurality of air impelling backwardly disposed blades spaced about said shaft and secured longitudinally thereon, a plurality of resilient beater rods carried on said shaft approximately radially thereto, said beater rods being spaced about said shaft and longitudinally therealong, motor means operatively connected to said shaft for rotating said shaft and foliage guiding means secured to said cylinder on either side of said gap at the forward end of said cylinder adapted divergingly to extend said gap ahead of said cylinder, each of said guides being formed with an acute angle at its forward end to diverge the upper edges of said guides toward said cylinder and one of said guides being formed to overlay the upper edge thereof in the direction of the other of said guides for the purpose of guiding the foliage of said plants in the direction of rotation of said shaft as said cylinder passes along said row and said gap receives said foliage.

4. A harvester for harvesting the foliage from the ground held stems of a row of bush beans in their green state, said harvester comprising: an enclosing means formed with a forward end opening, a rearward end opening, a downwardly facing opening extending longitudinally between said forward and rearward openings, and another opening; carriage means for supporting said enclosing means longitudinally of said row and tangentially of the ground at said downwardly facing opening; motor means operatively associated with said carriage means for propelling said enclosing means longitudinally of said row and said downwardly facing opening successively to receive the above ground parts of the plants of said row through said forward end opening, to pass the ground held stems of said plants along said downwardly facing opening and out said rearward end opening of said enclosure; beater means rotatably carried within said enclosure for successively beating the foliage from the stems of said plants; centrifugal means rotatably carried within said enclosure for discharging said foliage from said enclosing means through said other opening; and motor means operatively associated with said beater means and said centrifugal means for rotating said beater means and said centrifugal means.

References Cited in the file of this patent
UNITED STATES PATENTS

| | | |
|---|---|---|
| 16,052 | Foote | Nov. 11, 1856 |
| 1,401,829 | Swindell | Dec. 27, 1921 |
| 1,917,583 | Griffin | July 11, 1933 |
| 1,926,388 | Jones | Sept. 12, 1933 |
| 1,931,471 | Jones | Oct. 17, 1933 |
| 2,481,652 | Fort | Sept. 13, 1949 |
| 2,645,893 | Horst | July 21, 1953 |
| 2,706,373 | Nisbet | Apr. 19, 1955 |